Patented July 12, 1932

1,866,571

UNITED STATES PATENT OFFICE

MARKUS LARSSON, OF BERLIN, GERMANY, ASSIGNOR TO KUNSTDÜNGER-PATENT-VER-WERTUNGS-AKTIENGESELLSCHAFT, OF GLARUS, SWITZERLAND

METHOD OF PRODUCING A MIXTURE OF CALCIUM NITRATE AND AMMONIUM NITRATE

No Drawing. Application filed May 25, 1929, Serial No. 366,079, and in Sweden June 5, 1928.

This invention relates to an improved method of producing a mixture of calcium nitrate and ammonium nitrate.

It has already been proposed to produce a mixture of calcium nitrate and ammonium nitrate from calcium carbonate which is obtained by reacting upon calcium sulphate with ammonia and carbon dioxide, by leaving ammonium sulphate solution in the calcium-carbonate and thereafter dissolving this mixture in nitric acid, the ammonium sulphate reacting with calcium nitrate formed to form calcium sulphate and ammonium nitrate. It has proved that the calcium sulphate is then generally obtained in such state that it can only with difficulty be separated from the solution.

I have now found that this inconvenience can be avoided by the calcium sulphate being first caused to crystallize as semihydrate $(2CaSO_4 \cdot H_2O)$ and said semihydrate thereafter being recrystallized into gypsum

$(CaSO_4 \cdot 2H_2O)$, the gypsum then being obtained in such state that it can be easily separated from the solution.

The semihydrate is, preferably, obtained by the calcium carbonate being dissolved either at a high temperature, say 80° C. or more, or at usual temperature and the reaction products being subsequently heated to a high temperature. In both cases the solution, however, has to be rather concentrated. The recrystallization of the semihydrate into gypsum is then brought about by the temperature of the solution being lowered or by its concentration being reduced or by these two steps combined.

On the recrystallization gypsum in the form of short crystals or fragments of crystals is, preferably, added, the calcium sulphate being in this case chiefly precipitated on the crystals added. In this manner a gypsum easy to settle is obtained, which can be separated from the solution of calcium nitrate and ammonium nitrate without difficulty.

In order to produce gypsum crystals which are suitable as addition in the recrystallization of the calcium sulphate from semihydrate into gypsum and simultaneously to obtain the gypsum leaving the system in the shape of crystals of the size desired the process is, preferably, carried out in the following manner. The solution produced together with the gypsum crystals of different sizes contained therein are transferred, after the finishing of the recrystallization, into an apparatus, as for instance a classifier of a well-known type, in which the greater crystals are separated from the main portion of the solution, which still contains the smaller crystals in suspension. The solution freed from the great gypsum crystals together with the smaller gypsum crystals suspended therein is then transferred into a decantation tank, in which the gypsum is permitted to settle so that the solution can be decanted. The bottom slime, consisting of the smaller gypsum crystals together with a small quantity of solution, is brought back to the recrystallization vessel in which the small crystals have opportunity to increase and thus to obtain the desired size. Generally small gypsum crystals as well as great ones are obtained in the recrystallization process so that the process may be carried on continuously.

*Example.*—405 grams of a filter cake obtained by drawing off the solution from 1 litre of mud from the conversion of calcium sulphate into ammonium sulphate and calcium carbonate by means of ammonia and carbon dioxide, and containing 250 grams of calcium carbonate and 135 grams of 40% ammonium sulphate solution were dissolved in 630 grams of 50% nitric acid with an addition of 80 grams of water. The temperature was maintained at 90 to 95° C. When all evolution of gases had ceased the solution was cooled to about 60° C. and 40 grams of gypsum crystals suspended in a small quantity of concentrated calcium nitrate solution were added. After 4 to 5 hours the semihydrate primarily formed had recrystallized into gypsum in the shape of great and well-shaped crystals which could easily be separated from the solution.

What I claim is:

1. A method of producing a mixture of calcium nitrate and ammonium nitrate, which comprises reacting upon calcium sulphate with ammonia and carbon dioxide to form calcium carbonate and ammonium sulphate, removing the greater part of the ammonium sulphate solution, dissolving the remaining slurry in nitric acid under such conditions of temperature and concentration that the calcium sulphate by-product formed crystallizes as semihydrate, then causing the semihydrate to recrystallize into gypsum by lowering the temperature of the solution, and finally separating the gypsum from the solution produced.

2. A method of producing a mixture of calcium nitrate and ammonium nitrate, comprising reacting upon calcium sulphate with ammonia and carbon dioxide to form calcium carbonate and ammonium sulphate, removing the greater part of the ammonium sulphate solution, dissolving the remaining slurry in nitric acid, subjecting the reaction products to a temperature of at least 80° C., thus bringing the calcium sulphate by-product thereof to crystallize substantially as semihydrate in the solution, then causing the semihydrate to recrystallize into gypsum by lowering the temperature, and finally separating the gypsum from the solution.

3. A method of producing a mixture of calcium nitrate and ammonium nitrate, comprising reacting upon calcium sulphate with ammonia and carbon dioxide to form calcium carbonate and ammonium sulphate, removing the greater part of the ammonium sulphate solution, dissolving the remaining slurry in nitric acid, subjecting the reaction products to a temperature above 80° C. and then to a lower temperature in presence of small gypsum crystals to convert the calcium sulphate by-product thereof into an easily settleable form of gypsum, and finally separating the gypsum from the solution.

4. A method of producing a mixture of calcium nitrate and ammonium nitrate, which comprises reacting upon calcium sulphate with ammonia and carbon dioxide to form calcium carbonate and ammonium sulphate, removing the greater part of the ammonium sulphate solution, dissolving the remaining slurry in nitric acid, crystallizing the calcium sulphate by-product thereof as semihydrate by subjecting the reaction products to a temperature of at least 80° C., adding thereto a solution containing small crystals of gypsum while cooling the mixture until the semihydrate recrystallizes into gypsum, separating the larger crystals of gypsum from the solution, and removing the principal portion of the solution therefrom, thereby rendering the remaining small gypsum crystals with their adherent solution suitable for return into the cycle of operation.

In testimony whereof I have signed my name.

MARKUS LARSSON.